Sept. 11, 1934.     E. A. SPERRY     1,973,545
WAKELESS TORPEDO
Original Filed July 6, 1923     3 Sheets—Sheet 1
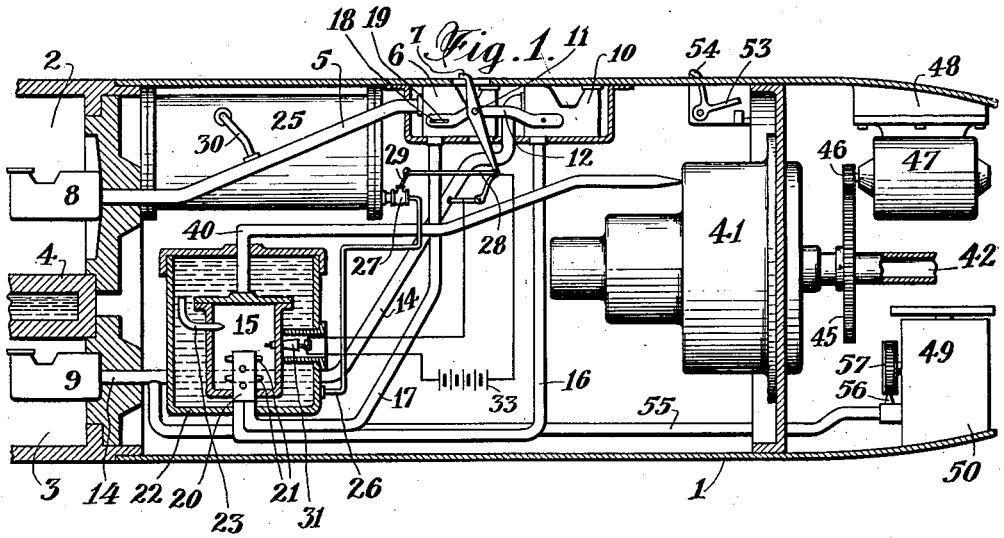
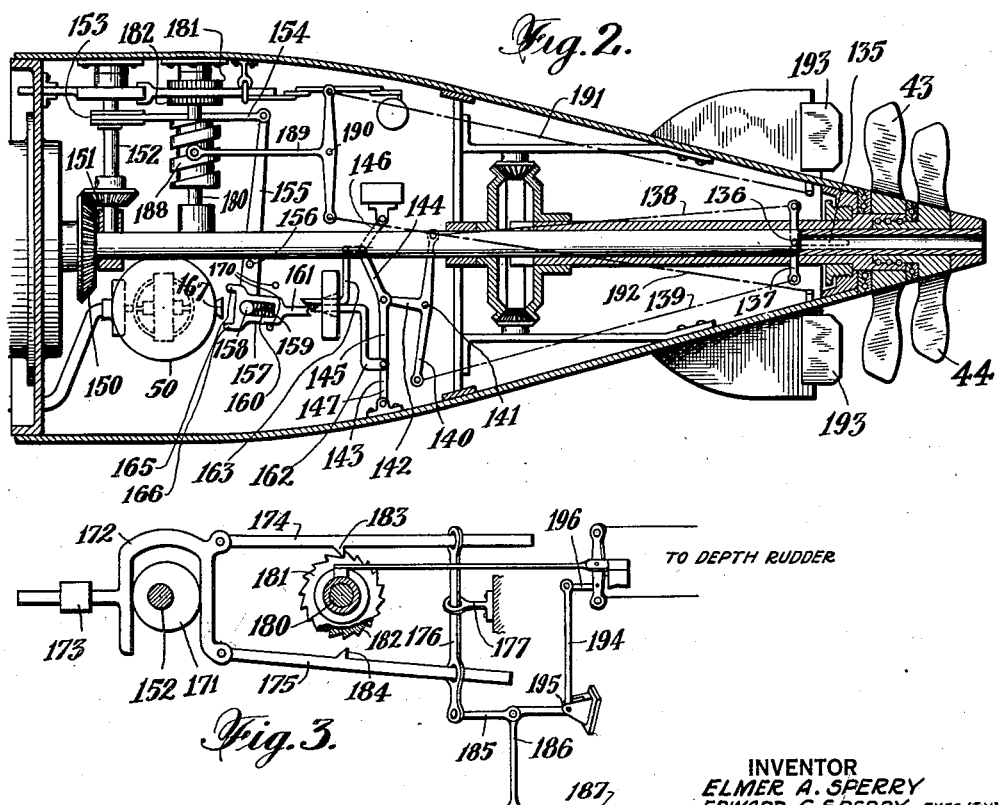
INVENTOR
ELMER A. SPERRY
EDWARD G. SPERRY, EXECUTOR
BY
Joseph N. Lipschutz
ATTORNEY Sept. 11, 1934.     E. A. SPERRY     1,973,545
WAKELESS TORPEDO
Original Filed July 6, 1923    3 Sheets-Sheet 2
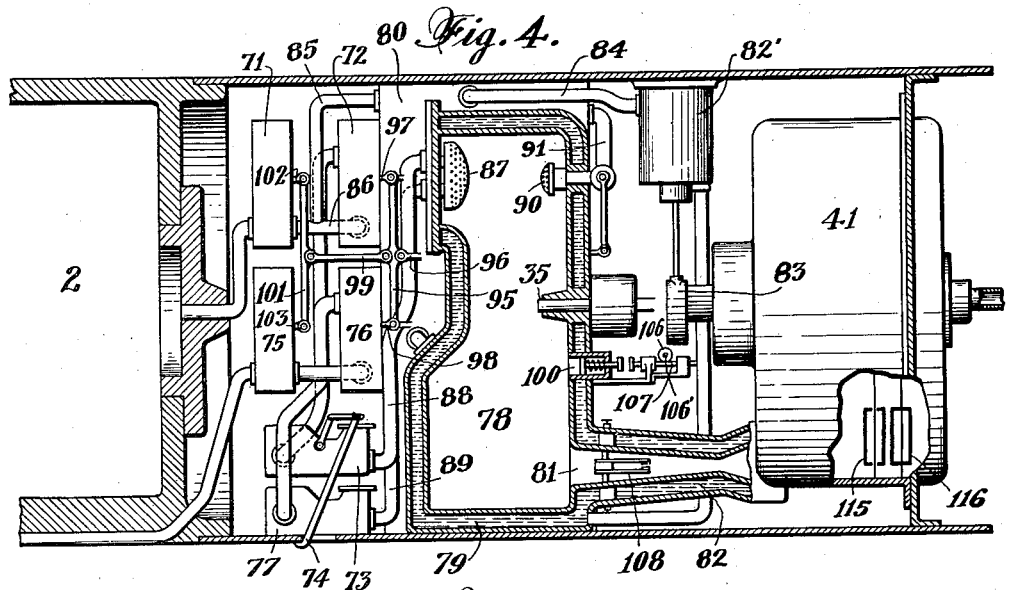
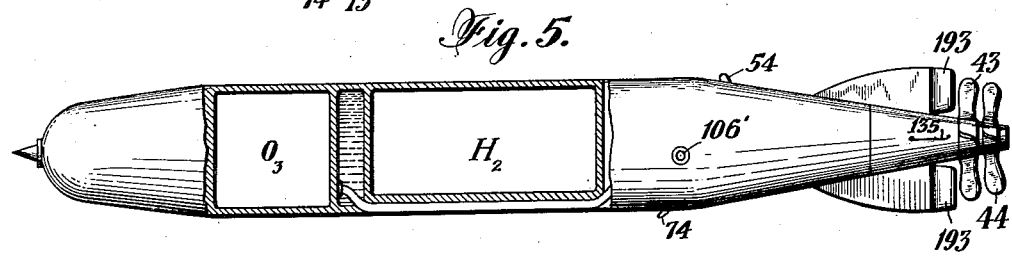
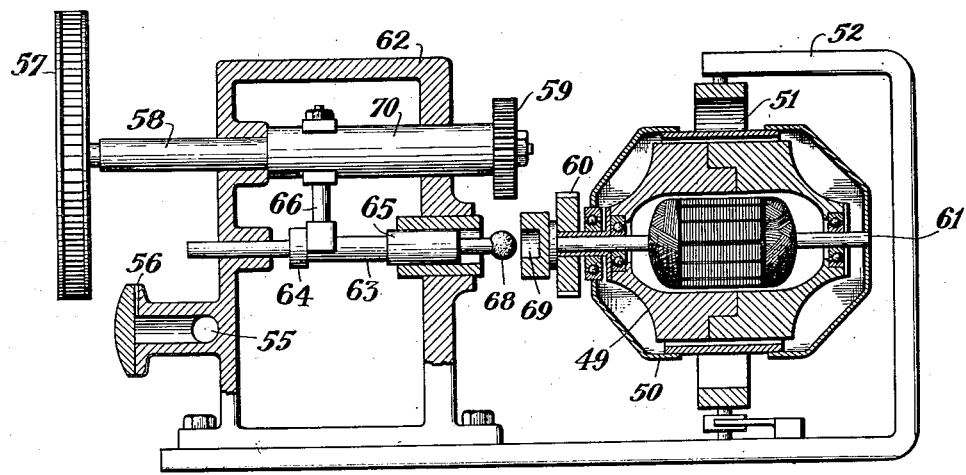
INVENTOR
ELMER A. SPERRY
EDWARD G. SPERRY, EXECUTOR
BY Joseph H. Lipschutz
ATTORNEY Sept. 11, 1934.    E. A. SPERRY    1,973,545
WAKELESS TORPEDO
Original Filed July 6, 1923    3 Sheets-Sheet 3
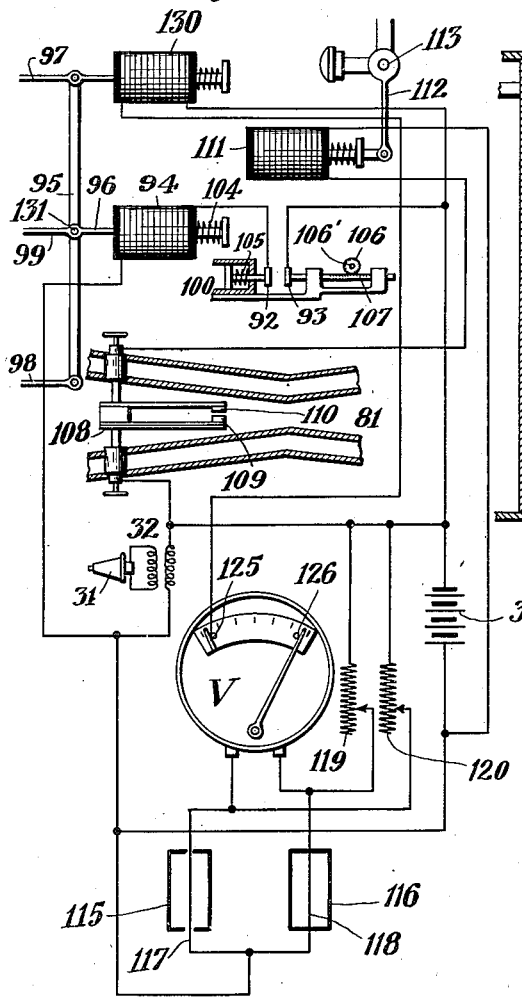
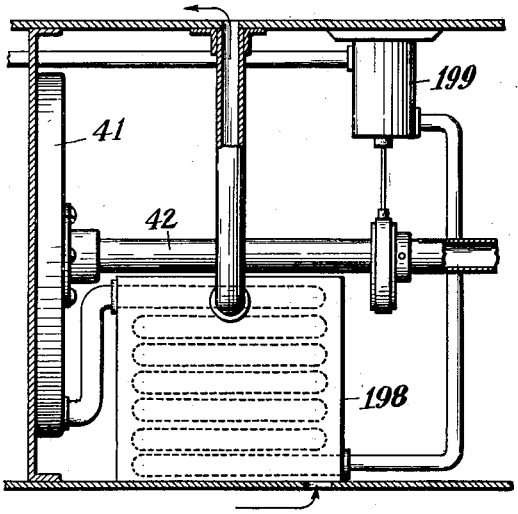
INVENTOR
ELMER A. SPERRY
EDWARD G. SPERRY, EXECUTOR
BY
ATTORNEY Patented Sept. 11, 1934

1,973,545

UNITED STATES PATENT OFFICE 1,973,545

WAKELESS TORPEDO

Elmer A. Sperry, deceased, late of Brooklyn, N. Y., by Edward G. Sperry, executor, Brooklyn, N. Y., assignor to Sperry Development Company, Brooklyn, N. Y., a corporation of Delaware Original application July 6, 1923, Serial No. 649,881. Divided and this application September 15, 1931, Serial No. 562,864

8 Claims. (Cl. 114—24)

This invention relates to torpedoes and has for its principal object the provision of a torpedo whose trajectory through the water is unaccompanied by a visible wake which heretofore has frequently enabled a ship to avoid torpedoes. This application is a division of copending application Serial No. 649,881, filed July 6, 1923. The visibility of the trajectory of a torpedo heretofore employed has been due entirely to the release from the torpedo of a large quantity of air from the compressed air driving plant of the torpedo. The released air rising to the surface formed a track of white foam six to ten feet wide which was easily visible at a great distance. This invention therefore provides a driving plant for the torpedo which yields no wake or other visible indication of its path, thereby greatly enchancing its value as a weapon of naval warfare.

A further object of this invention is the provision of a driving plant as described which will increase the effective range of the torpedo without increasing the weight, bulk or expense of the power plant.

To provide a power plant as described, I employ steam as the active agent so that when it has expended its force and is discharged into the water, it is condensed without any visible effect. For producing steam there may be employed as oxyhydrogen flame acting upon a supply of water. It is a further object of my invention to provide sources of compressed oxygen and hydrogen and suitable means for igniting the same.

A further object is the provision of a firequenching partition between the sources of compressed gases.

A further object of the invention is the provision of means for supplying oxygen and hydrogen to the combustion chamber in such manner in starting the device to avoid possibility of explosion.

A further object is the provision of means connected to the combustion chamber whereby the maximum pressure within said chamber may be controlled at will.

A further object is the provision of differential means whereby the pressure within the combustion chamber controls the rate of flow of water from a storage-tank to said chamber wherein it is converted by the heat of the oxy-hydrogen flame into steam.

A further object is the provision of means for detecting the presence of an excess of hydrogen and for automatically controlling the flow of oxygen and hydrogen to decrease one and increase the other depending upon whether there is an excess or a deficiency of hydrogen.

A further object is the provision of means within the torpedo for operating the depth control means thereof to maintain the torpedo at a pre-determined distance below the surface of the water and for performing said operation without rendering the path of the torpedo visible.

A further object is the provision of means within the torpedo for operating the steering rudder to maintain the torpedo upon a predetermined course and for performing said operation without rendering the path of the torpedo visible.

A further object is the provision of a continuously burning cartridge within the combustion chamber.

A further object of this invention is the utilization of the power plant hereinbefore set forth for spinning up the director gyro within the torpedo.

Other objects and advantages will become apparent as the description of the invention proceeds.

In the accompanying drawings,

Fig. 1 is a longitudinal section through a portion of a torpedo constructed according to my invention.

Fig. 2 is a section through the tail of the torpedo showing a part of my invention embodied therein.

Fig. 3 is a detail of the depth-control mechanism.

Fig. 4 is a view similar to Fig. 1 but employing a modified form of the structure shown in the latter figure.

Fig. 5 is a side elevation of a torpedo having a portion thereof broken away to disclose another modification.

Fig. 6 is a section through a device for spinning up the director gyro.

Fig. 7 is a diagrammatic representation of various controlling devices, an showing also a hydrogen detector.

Fig. 8 is a section through the torpedo casing showing a condenser for disposing of the exhaust steam.

Within the torpedo shell 1, there is positioned a plurality of flasks 2 and 3 containing different gases under high pressure (from 2000 to 3000 lbs. per sq. in.). The gases are so selected that they will unite chemically with the production of a maximum amount of heat and also so that the resulting product of combustion is a vapor or a gas, which will condense in its entirety to a liquid or solid before or upon being discharged from the torpedo into the water. The gases preferred in this invention are hydrogen and oxygen, although other combinations of elements which will satisfy the above requirements may be used if desired.

The larger tank 2 is designed for the compressed hydrogen, while the smaller tank 3 is for the compressed oxygen. A gas-trap 4 may be provided between the tanks in the form of a hollow partition filled with a fluid such as water. Said trap will prevent formation of a mixture of gases in either tank with consequent danger of the flame feeding back from the burner (to be hereinafter described) into the tank and exploding the mixture. The hydrogen is led from tank 2 through pipe 5 to the usual control and reducing valve 6 which is operated by a trip 7 as the torpedo leaves the launching tube. Preferably the reduction is effected in two stages, first by a valve 8 shown within tank 2, and second by the valve 6. It will be readily understood by those skilled in the art that the tank pressure of from 2000 to 3000 lbs. is reduced to a uniform pressure of say from 400 to 500 lbs. per sq. in. by said valves. Likewise the oxygen is also led through control and reducing valves 9 and 10, by pipe 14, the latter of which is preferably operated from the same trip 7 which operates valve 6. The trip 7 is pivoted at 11 and has pivoted thereto above pivot 11 a link 12, so that when trip 7 is actuated by the discharge of the torpedo from the tube, link 12 will be moved laterally. During its lateral movement, link 12 opens both valves. The link is connected directly to valve 10 without lost motion, so that oxygen is supplied to a combustion chamber 15 through pipe 16 as soon as the link is operated. The link 12 is connected to valve 6, however, by a pin-and-slot connection 18, 19, so that a certain amount of lost-motion occurs before valve 6 is opened to permit hydrogen to flow through pipe 17 to chamber 15. In other words, as trip 7 is actuated by the launching of the torpedo, the oxygen valve is opened a predetermined period before the hydrogen valve so that oxygen enters the combustion chamber before hydrogen and thus permits a flame to be established at the jet immediately that the hydrogen enters, and offers protection against explosion which might result if hydrogen entered chamber 15 mixed with the air present to form an explosive mixture and was ignited. The length of time one valve is opened before the other is very slight and is almost simultaneous with said other valve. The mechanism hereinbefore described presupposes that at the beginning of the operation there is no air or other combustion-supporting gas in chamber 15.

From the valves the gases are led to a common burner 20 within the combustion chamber 15 through the pipes 16 and 17. The exact form of burner employed, or whether or not the oxygen and hydrogen are mixed prior to combustion, is of course immaterial so far as the broad aspects of this invention are concerned. In the form shown, the hydrogen and oxygen are united at the nozzle as in the oxy-hydrogen blow-pipe. The burner 20 is shown as provided with a plurality of nozzles 21 directed in a plurality of directions. It will also be understood by those skilled in the art that the whole chamber is maintained under suitable pressure, say only slightly lower than that of the entering gases, but contrary to existing practice, I employ no alcohol or liquid fuel flame in the chamber, depending entirely upon the burning of the gases for the production of heat. On account of the much higher temperatures produced by the burning of hydrogen in oxygen than by the burning of alcohol in air, I prefer to provide cooling means for the combustion chamber, preferably in the form of a water-jacket 22 which may partially or wholly surround the chamber. I prefer also to spray water into the combustion chamber both to keep the temperature down and to supply a greater volume of superheated steam at workable pressures. The water for the spray is preferably taken from the water jacket and is sprayed into the chamber 15 through a nozzle or nozzles 23. Said nozzles supply the water preferably from the upper, hotter portion of the jacket so that heated water is supplied to the combustion chamber. The supply of water for the jacket is maintained by a reservoir 25 through pipe 26 and control valve 27. Preferably said valve is opened by trip 7, as by means of link 28 and valve lever 29.

The water supply is preferably maintained under pressure greater than that of chamber 15, but preferably less than that of tank 2, as by having a connection through branch pipe 30, with pipe 5 between valves 8 and 6, so that water will be atomized as it enters the combustion chamber where it instantly flashes into steam.

For igniting the combustible mixture there may be employed a spark plug 31 in circuit with a spark coil 32 and a suitable source of current, such as batteries 33 (see Fig. 7), or I may employ a continuously-burning cartridge or fuse 35, as shown in the modified form of my device in Fig. 4, and adapted to burn continuously for a predetermined time to establish the flame which is thereafter self-sustaining by the ignition of the oxygen and hydrogen mixture. It will be understood that the spark coil 32 or cartridge 35 may be employed interchangeably on the Fig. 1 and Fig. 4 devices.

The superheated steam is led by pipe 40 to the turbine 41, while the exhaust steam is taken out through the hollow propeller or tail shaft 42 and is discharged at the tail of the torpedo beyond the propellers 43 and 44 or in any manner best suited to its complete condensation. A suitable system for condensing, such as a condenser 193 and vacuum pump 199, may be employed in connection therewith, if desired (see Fig. 8). As shown by the arrows, sea water is circulated around the coils of the condenser by convection. It will be readily apparent, however, that even if the steam is discharged directly into the water, it will not produce bubbles and foam at the surface such as is produced by the discharge of air in ordinary torpedoes, since the steam on coming in contact with the cold water will condense before any of it reaches the surface. It is well known in the art that torpedoes usually travel a considerable distance under the surface of the water.

Driven from the shaft 42 by gearing 45, 46 is a generator 47 suspended by a bracket 48 from the torpedo casing. Said generator supplies current to the electrically-driven gyroscope 49 enclosed in casing 50 which is pivotally mounted on a horizontal axis in ring 51 and said ring in turn pivotally mounted on a vertical axis in a fixed bracket 52. The gyro controls the course of the torpedo. In order to render the generator effective, there may be provided a knife-switch 53 in the form of a bell-crank having one arm 54 extending outside the casing to be operated during launching of the tube. Since it is desired to have the gyro running at full speed before the torpedo strikes the water, means are provided for spinning up the gyro before the generator becomes effective. For this purpose the oxygen from tank 3 may be utilized by means of a pipe 55 tapping pipe 14 between valves 9 and 10 to obtain an intermediate pressure. By connecting pipe 55 in advance of or beyond either of said valves, various pressures may be obtained. The oxygen is delivered by pipe 55 to a nozzle 56 adjacent a turbine or bucket wheel 57 mounted upon a shaft 58 having a sleeve 70 thereon upon which is fixed a gear 59 adapted to mesh with a gear 60 on an end of the gyro rotor axis 61. Sleeve 70 has engagement with shaft 58 by means permitting rotary movement of shaft 58 independent of sleeve 70 but causing said sleeve and shaft to move together axially. Sleeve 70 is slidably axially in bracket 62 by means of a slidable shaft 63 having hubs 64 and 65 thereon engageable on opposite sides of a depending arm 66 fixed to said sleeve, so that gear 59 and turbine wheel 57 may be moved into and out of engagement with gear 60 and nozzle 56, respectively. Shaft 63 is provided with a locking member 68 adapted to engage in a socket 69 in the end of the rotor shaft to lock the gyroscope during the initial spinning up. It will be apparent that the oxygen supply will be rendered effective by the operation of trip 7 before the generator is rendered effective by the operation of switch 53. The means for disengaging the initial spinning means and for shutting off the supply of gas is old in the art (see patents to Leavitt No. 1,145,025, July 6, 1915, and Dieter No. 1,148,154, July 27, 1915) and need not be described here. While the use of oxygen is preferable, it will be understood that hydrogen may be utilized in a similar manner for initial spinning up.

In the form of invention shown in Fig. 4, two reduction valves 71 and 72 for the hydrogen tank 2 are placed side by side, while the starting valve 73, operated by latch 74, does not have combined therewith a reduction valve as in Fig. 1. The oxygen and hydrogen tanks instead of being placed one above or parallel to the other, are placed end to end with a water-filled partition or gas-trap between them as shown in Fig. 5. The oxygen tank 3 is similarly provided with reduction valves 75 and 76 and starting valve 77. Latch 74 has a direct connection with starting valve 77 and a pin-and-slot connection with starting valve 73, so that the oxygen will be fed to the combustion chamber before the hydrogen. The combustion chamber 78 is again provided with a water-jacket 79 which is connected with the water-tanks 80, one on each side of the combustion chamber (only one being shown). A steam-pipe 81 connecting the chamber 78 and turbine 41 may be waterjacketed as at 82 and may have a reduced throat portion to increase the velocity of the steam in the well-known manner. Water is circulated through the tanks and jacket positively to prevent overheating of the water in the jacket by means such as a pump 82' driven from the turbine shaft through an eccentric 83 or the like, the pump being connected to the water tanks by pipes 84. The water is brought under suitable pressure between 500 pounds and 3000 pounds for example, by being connected by pipe 85 to pipe 86 connecting reducing valves 71 and 72. The oxy-hydrogen flame is projected into the combustion chamber 80 by burner 87 which is fed by pipes 88 and 89 leading from valves 73 and 77, respectively. The water may be projected into the combustion chamber in opposite direction to the flame by means of a spray nozzle 90 connected to the water tank through pipe 91. The mixture may be ignited by the sparking device 31 of Fig. 1 or the continuously-burning cartridge 35 of Fig. 4.

Preferably also, I provide means for preventing the production of too great heat or too great pressure, or both, within the combustion chamber. This may be accomplished by thermostatic and pressure regulation of the flow of combustible mixture through the burner, or the amount of water injected, or both. For this purpose I have shown a pressure regulator 100 which may be located in a side wall of chamber 78 as governing the admission of gases, and a thermostat as governing the supply of water. Said pressure regulator 100 is arranged to close contacts 92, 93 (Fig. 7) when the pressure in chamber 78 exceeds a predetermined amount. Closing of said contacts excites a solenoid 94 which operates to push to the left lever 95 which is pivoted to rod 96 connected to the armature of the solenoid, thereby simultaneously partially closing gas valves 72 and 76 through valve stems 97 and 98. Preferably also, said lever 95 is connected by a link 99 to a corresponding lever 101 connected with valve stems 102, 103 of valves 71 and 75, so that all of said valves are partially closed when the pressure within the chamber reaches the limit of pressure. As soon as the pressure is reduced, however, the regulator opens the contacts and the valves are restored to their normal position by spring 104.

The maximum pressure to be maintained within the chamber 78 can be regulated by adjusting the pressure regulator 100. Although various forms of adjusting mechanisms may be employed either to vary the tension of spring 105 or the distance between contacts 92 and 93, I have illustrated one means of the latter type. For this purpose, contact 93 is mounted movable relative to contact 92 as by means of gear 106 engaging rack 107 on a shaft suitably supported in a bracket and which carries said contact 93 at its other end. The shaft 106' carrying gear 106 extends through the torpedo casing to permit rotation from outside the casing. By increasing the gap between contacts 92 and 93 the maximum pressure within chamber 78 is increased, while by decreasing the distance between the contacts, the maximum pressure is decreased. The maximum pressure within the combustion chamber may thus be regulated at will.

Since the pressure upon the water in the reservoirs (in Fig. 4), or reservoir (in Fig. 1) depends upon the pressure existing between valves 71 and 72 (in Fig. 4) or valves 8 and 6 (in Fig. 1), it is apparent that by varying the degree of opening of the valves, the pressure transmitted to the reservoirs through pipe 85, for example, is dependent upon the pressure existing between the reducing valves. By varying the supply of gas corresponding to the maximum pressure in the combustion chamber, the amount of water supplied is correspondingly varied.

For controlling the temperature within the combustion chamber, I control the admission of water preferably thermostatically. For this purpose I have shown the thermostat 108 which may be located in the steam delivery pipe 81. Said thermostat is arranged to close contacts 109 and 110 when the temperature in said passage becomes too high. Said contacts excite solenoid 111 connected to a lever 112 secured to the stem of valve 113 to increase the supply of water injected into chamber 78. When the temperature falls sufficiently, the supply of water is decreased by the thermostatically-controlled means.

It will be understood that the pressure-regulating and temperature-controlling devices have been illustrated in connection with chamber 78 only for convenience, but that both of the devices can be applied to chamber 15, which is obvious from the foregoing description.

I also prefer to provide means for regulating the amount of hydrogen injected into the combustion chamber. To this end, I may so design and adjust the apparatus as to tend to inject hydrogen at a rate sufficient to consume all of the oxygen injected and leave a certain amount of hydrogen in excess. By this means I insure a reducing flame and mixture, rather than an oxidizing flame, thus avoiding damage to the combustion chamber and other parts of the apparatus through oxidation at the high temperatures prevailing in the system. The amount of hydrogen in excess should be regulated for keeping it within desirable limits to prevent waste of the gas and discharge of a sufficient quantity of it from the exhaust of the turbine to make a visible wake. I have therefore provided in the exhaust of the turbine, a hydrogen detector whereby the percentage of excess hydrogen may be kept within any desired limits, even approaching zero. The hydrogen detector which I employ may be such as described in U. S. Patent of Preston R. Bassett, No. 1,467,084 dated September 4, 1923, the resistance of a certain coil being greatly reduced whenever hydrogen is present. For this purpose I provide preferably in the exhaust of the turbine two receptacles 115 and 116, one of which (here shown as 116) is sealed, while the other is open to the exhaust gases. Through each of said receptacles passes a conductor 117, 118, having a well-defined temperature coefficent and forming two arms of a Wheatstone bridge. The other two arms of said bridge are known resistances 119 and 120, the source of E. M. F. is the battery 33, and the voltmeter is shown at V. The wire 118 being sealed will not come in contact with the exhaust gases, but the wire 117 being exposed to said gases will, when a change in the amount of hydrogen passing over it occurs, vary its conductivity (because the greater the quantity of hydrogen, the more heat is abstracted from conductor 117). Any disturbance of the balance of the Wheatstone bridge will be apparent on the voltmeter. In order that the conductors may be maintained at the same temperature, receptacle 116 is constructed with thin walls of a highly conductive material, such as copper. The conductors 117, 118 are preferably formed of an aluminum-coated steel or iron wire known as calorized wire. The degree of excess of hydrogen may be regulated through the degree of unbalancing of the bridge.

When a predetermined excess of hydrogen is present, there will be a predetermined reading of the voltmeter causing contacts 125 and 126 to engage and close a circuit through a solenoid 130. This will rotate lever 95 about pivot 131 as a center which will tend to close valves 71 and 72 and open valves 75 and 76, thereby decreasing relatively the amount of hydrogen and also increasing relatively the amount of oxygen. By this means the proper balance between the two gases may be maintained, so that complete combustion is secured with the desired excess of hydrogen.

Not only the driving of the torpedo is accomplished by my invention without a visible wake being produced, but also the maintenance of said torpedo at a predetermined depth below the surface and on a predetermined course I accomplish by means which yield no visible wake. For controlling the course of the torpedo I may employ the gyro 50. The steering rudders 135 are fixed upon a shaft 136 to which is attached a lever 137, the ends of said lever being connected by cables 138 and 139 to the arms of a bell-crank 140 pivoted at 141. The bell-crank is provided with a third arm 142 pivoted to a bell-crank 143 having arms 144 and 145. Links 146 and 147 are pivotally connected respectively at one end to arms 144 and 145 of bell-crank 143 and having their other ends pivoted to the torpedo casing. Arm 144 and link 146 thus form one knuckle or toggle and arm 145 and link 147 a second knuckle or toggle, and when said second toggle is straightened out (as shown in Fig. 2) bell-crank 140 is rotated in one direction to rotate rudders 135 to the limit of their throw in one direction, while when said first toggle is straightened out, the bell-crank 140 is rotated in the opposite direction to rotate rudders 135 to the limit of their throw in the opposite direction. The toggles are oppositely acting. For straightening the toggles the tail shaft may be provided with a gear 150 meshing with a gear 151 on a shaft 152 carrying an eccentric 153 adapted to oscillate link 154 and lever 155 connected to said link. Said lever is pivoted at 156 and carries at its lower end (in Fig. 2) a block 157, to which it is pivotally connected by a pin-and-slot connection 158, 159 said pin operating against the action of a spring 160 in said slot. The block 157 carries a prong 161 adapted to engage selectively the ends of links 162, 163 connected to the pivots of toggles 145, 147 and 144, 146, respectively, to straighten said toggles and thus operate the rudder to one side or the other.

Means are provided for operating the rudder in a direction to restore the torpedo to the predetermined course. For this purpose, block 157 is provided with a forwardly-extending fork having prongs 165, 166 to either side of a projection 167 carried by the gyroscope. If the torpedo traveled an exactly straight course, prongs 165 and 166 would not engage the projection 167, block 157 would be centrally positioned, and both toggles would be operated to the same extent, so that the rudder would not be displaced. The torpedo travels, however, a sinuous course, so that except when the torpedo passes through central position, the gyroscope is always turned with respect to the torpedo, and projection 167 will engage prong 165 or 166 to rotate block 157, so that prong 161 engages link 162 or 163. Pins 170 limit the rotation of the block. The gearing is such that block 157 will be rotated by the gyroscope in a direction to cause prong 161 to engage that link (162 or 163) which will operate the rudder in a direction to return the torpedo to its course. As the torpedo returns to its course and swings beyond it, block 157 will be rotated by the gyroscope to cause prong 161 to engage the other link and actuate the rudder in the opposite direction.

It will be apparent that I have provided a purely mechanical, non-gas emitting device for operating the steering rudders so that no wake is produced thereby.

Similarly, I provide a non-gas-emitting depth control device. For this purpose, I mount upon shaft 152 (which is driven from the tail shaft) an eccentric 171 which is in engagement with a frame 172 slidably mounted in a partition or bracket 173 and has pivotally mounted thereon a pair of spaced arms 174 and 175 slidably supported in a link 176 suspended from the torpedo shell by a bracket 177. Between said arms is positioned a shaft 180 having fixed thereon a pair of oppositely-toothed ratchets 181 and 182 with which engage pawls 183 and 184 on arms 174 and 175, respectively. The supporting link 176 is adapted to maintain the arms 174 and 175 spread apart so that not more than one of said arms can have its pawl in engagement with the respective ratchet at any given time, and in centralized position neither pawl engages its ratchet. The link 176 is connected to one arm 185 of a bell-crank 186, the other arm of which is connected in a suitable manner, as by a cable 187 to a hydrostatic control which can be set for a predetermined depth. When the torpedo moves to some different depth, the bell-crank 186 is rotated in one direction to operate link 176 to cause one of the pawls to engage its respective ratchet and rotate shaft 180 in the same direction. A spiral 188 is formed on shaft 180 and in the groove formed by said spiral operates the end of an arm 189 of a bell-crank or walking-beam pivoted at 190, the ends of the other arms of said bell-crank being connected by cables 191, 192 to the depth rudders 193. Obviously, rotation of the spiral by one pawl and ratchet in one direction will rotate the depth rudders in a given direction and rotation of the spiral in the other direction by the other pawl and ratchet will rotate the depth rudders in the other direction. The gearing is such that when the predetermined depth is exceeded, the rudders are operated in a direction to raise the torpedo and when the predetermined depth has not been reached, the rudders are operated to lower the torpedo.

Bell-crank 186 is pivoted to one arm of bell-crank 194 pivoted on the fixed frame at 195, the other arm of bell-crank 194 being connected by a link 196 to one arm of walking-beam 189, so that as said beam is operated to vary the position of the depth rudders, a follow-up system is actuated to disengage the pawl from the ratchet. The depth rudders remain in the set position (since after the pawl and ratchet have been disengaged, there is no further actuation of said rudders) until the predetermined depth is reached. The torpedo continues in the same direction beyond the predetermined depth, whereupon the other pawl and ratchet become effective to operate the depth rudders in the opposite direction. When the predetermined depth is reached, neither pawl is in engagement with its ratchet and there is no actuation of the depth rudders.

It is thus apparent that the depth control operating mechanism, like the course-control operating mechanism, is actuated without the production or emission of a gas which would form a visible wake or track.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a torpedo having a course control rudder and gyroscope, in combination, means for driving said torpedo, means for operating said rudder, means for maintaining the spin of said gyro, and a steam generating apparatus employing nothing but oxygen, hydrogen and water, all of said means being operated from said steam generating means without emitting a persistent gas.

2. In a torpedo having a course control rudder, means for driving said torpedo, a purely mechanical connection between said means and said rudder for operating the latter in either direction, said connection comprising a pair of oppositely-acting toggles, and a directive gyro for selectively engaging said toggles to control the direction of operation of the rudder.

3. In a torpedo having a course-control rudder, means for driving said torpedo, a purely mechanical connection between said means and said rudder for operating the latter in either direction, said connection comprising a pair of oppositely-acting toggles, means connected to said toggles whereby they are operated, and a directive gyro selectively engageable with said last-named means for controlling the direction of operation of the rudder.

4. In a torpedo having a depth control rudder, means for driving said torpedo, a purely mechanical connection between said means and said rudder, said connection comprising driving means for operating said rudder upwardly or downwardly, depth responsive means for controlling said driving means, and a follow-up means from said rudder to said driving means to render the latter ineffective.

5. In a torpedo having a depth control rudder, means for driving said torpedo, a purely mechanical connection between said means and said rudder, said connection being normally ineffective, depth-responsive means for rendering said connection effective, and a follow-up means from said rudder to said driving means for rendering the latter ineffective.

6. In a torpedo having a depth control rudder, means for driving said torpedo, a purely mechanical connection between said means and said rudder, said connection comprising a pair of oppositely-disposed driving means for operating said rudder upwardly or downwardly, said driving means being normally ineffective, depth-responsive means selectively connected to said pair of driving means to render one or the other of said driving means effective for operating the rudder in the desired direction, and a follow-up means from said rudder to said driving means for rendering the latter ineffective.

7. In a torpedo having a depth control rudder, means for driving said torpedo, a purely mechanical connection between said means and said rudder, said connection comprising a pair of oppositely-disposed ratchets, a pair of pawl members engageable with said ratchets for operating said rudder upwardly or downwardly, said pawl-members being normally ineffective, depth-responsive means connected to said ratchet members to render one or the other thereof effective for operating the rudder in the desired direction, and a follow-up means from said rudder to said ratchet members for rendering the latter ineffective.

8. In a torpedo having a course control rudder and gyroscope, in combination, means for driving said torpedo and means for operating said gyroscope, both of said means including a source of fluid under pressure, said fluid being completely soluble in water.

EDWARD G. SPERRY,
*Executor of the Estate of Elmer A. Sperry.*